US012804128B2

(12) United States Patent
(10) Patent No.: US 12,804,128 B2
(45) Date of Patent: Nov. 17, 2026

Cao et al.

(54) ENCODING MODE PREDICTION METHOD AND APPARATUS, ELECTRONIC DEVICE AND STORAGE MEDIUM

(71) Applicant: SANECHIPS TECHNOLOGY CO., LTD., Shenzhen (CN)

(72) Inventors: Zhou Cao, Shenzhen (CN); Ke Xu, Shenzhen (CN); Dehui Kong, Shenzhen (CN); Wei Yang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 39 days.

(21) Appl. No.: 18/879,886

(22) PCT Filed: Apr. 17, 2023

(86) PCT No.: PCT/CN2023/088685

§ 371 (c)(1),
(2) Date: Dec. 30, 2024

(87) PCT Pub. No.: WO2024/001433

PCT Pub. Date: Jan. 4, 2024

(65) Prior Publication Data

US 2025/0386003 A1 Dec. 18, 2025

(30) Foreign Application Priority Data

Jun. 30, 2022 (CN) ........................ 202210759310.6

(51) Int. Cl.
*H04N 19/103* (2014.01)
*H04N 19/14* (2014.01)
*H04N 19/176* (2014.01)

(52) U.S. Cl.
CPC .......... *H04N 19/103* (2014.11); *H04N 19/14* (2014.11); *H04N 19/176* (2014.11)

(58) Field of Classification Search
CPC .................................................. H04N 19/103
See application file for complete search history.

(56) References Cited

U.S. PATENT DOCUMENTS

2022/0321879 A1* 10/2022 Chadha ................ H04N 19/103
2023/0095387 A1* 3/2023 Dumas ................. H04N 19/167
375/240.26

(Continued)

FOREIGN PATENT DOCUMENTS

CN 111355956 A 6/2020
CN 111800642 A 10/2020

(Continued)

OTHER PUBLICATIONS

China Patent Office, the first office action (OA1) dated Aug. 20, 2025, for corresponding CN application No. 202210759310.6.

(Continued)

*Primary Examiner* — Jayanti K Patel
*Assistant Examiner* — Christopher Kingsbury Glover
(74) *Attorney, Agent, or Firm* — Li & Cai Intellectual Property (USA) Office

(57) ABSTRACT

An encoding mode prediction method and apparatus, an electronic device, and a storage medium are provided. The method includes: acquiring information of at least two frames of images to be processed, the at least two frames of images to be processed being at least two continuous frames of images; and inputting the information of the at least two frames of images to be processed to an encoding mode prediction network for prediction, and determining a target encoding mode. The encoding mode prediction network is a network obtained by training a convolutional neural network based on multi-size pixel blocks, and the target encoding mode is used for coding and/or decoding of the images to be processed.

12 Claims, 7 Drawing Sheets

(56) References Cited

U.S. PATENT DOCUMENTS

| | | | | |
|---|---|---|---|---|
| 2023/0224454 A1* | 7/2023 | Dumas | H04N 19/176 | |
| | | | 375/240.02 | |
| 2023/0254507 A1* | 8/2023 | Dumas | H04N 19/186 | |
| | | | 375/240.12 | |

FOREIGN PATENT DOCUMENTS

| | | | |
|---|---|---|---|
| CN | 112383777 | A | 2/2021 |
| CN | 113055670 | A | 6/2021 |
| CN | 114143540 | A | 3/2022 |
| CN | 114363632 | A | 4/2022 |
| KR | 20220007541 | A | 1/2022 |
| WO | WO2018099579 | A1 | 6/2018 |
| WO | WO 2021/069688 | A1 | 4/2021 |

OTHER PUBLICATIONS

WIPO, International Search Report issued on Jul. 3, 2023.

European Patent Office, the Extended European Search Report dated Jun. 2, 2026, for corresponding EP application No. 23829623.0.

* cited by examiner

ENCODING MODE PREDICTION METHOD AND APPARATUS, ELECTRONIC DEVICE AND STORAGE MEDIUM

CROSS REFERENCE TO RELATED APPLICATIONS

The present disclosure is a National Phase Application filed under 35 U.S.C. 371 as a national stage of PCT/CN2023/088685, filed on Apr. 17, 2023, an application claiming the priority to Chinese Patent Application No. 202210759310.6 entitled "ENCODING MODE PREDICTION METHOD AND APPARATUS, ELECTRONIC DEVICE AND STORAGE MEDIUM" and filed on Jun. 30, 2022, the contents of which are incorporated herein by reference in their entirety.

TECHNICAL FIELD

The present disclosure relates to the technical field of image processing, and in particular, to an encoding mode prediction method and apparatus, an electronic device, and a storage medium.

BACKGROUND

At present, the prediction coding technology is usually adopted in a video coding process to eliminate the correlation between pixels. For example, a difference between a reference pixel and a current pixel is coded to achieve video compression.

However, when a conventional video coding mode is selected, all prediction modes or some related prediction modes need to be traversed, and then the optimal prediction mode is selected as a final processing mode, so that the prediction process is complicated, which greatly increases computational complexity and prolongs processing time of video files.

SUMMARY

The present disclosure provides an encoding mode prediction method and apparatus, an electronic device and a storage medium.

An embodiment of the present disclosure provides an encoding mode prediction method, including: acquiring information of at least two frames of images to be processed, the at least two frames of images to be processed being at least two continuous frames of images; and inputting the information of the at least two frames of images to be processed to an encoding mode prediction network for prediction, and determining a target encoding mode, wherein the encoding mode prediction network is a network obtained by training a convolutional neural network based on multi-size pixel blocks, and the target encoding mode is used for coding and/or decoding of the images to be processed.

An embodiment of the present disclosure provides an encoding mode prediction apparatus, including: an acquisition module, which is configured to acquire information of at least two frames of images to be processed, the at least two frames of images to be processed being at least two continuous frames of images; and a prediction module, which is configured to input the information of the at least two frames of images to be processed to an encoding mode prediction network for prediction, and determine a target encoding mode, wherein the encoding mode prediction network is a network obtained by training a convolutional neural network based on multi-size pixel blocks, and the target encoding mode is used for coding and/or decoding of the images to be processed.

An embodiment of the present disclosure provides an electronic device, including: one or more processors; and a storage device having stored thereon one or more programs which, when executed by the one or more processors, cause the one or more processors to implement the encoding mode prediction method according to the embodiment of the present disclosure.

An embodiment of the present disclosure provides a computer-readable storage medium having stored thereon a computer program which, when executed by a processor, causes the processor to implement the encoding mode prediction method according to the embodiment of the present disclosure.

The above embodiments and other aspects of the present disclosure and the implementations thereof will be further described in BRIEF DESCRIPTION OF DRAWINGS, DETAIL DESCRIPTION OF EMBODIMENTS, and the claims.

DETAIL DESCRIPTION OF EMBODIMENTS

The accompanying drawings are intended to provide a further understanding of the technical solutions of the present disclosure and constitute a part of the specification. Together with the embodiments of the present disclosure, the drawings are used to explain the technical solutions of the present disclosure, but do not constitute any limitation to the technical solutions.

According to different positions of the reference pixel, video coding prediction mainly includes: an intra-frame prediction method and an inter-frame prediction method. The intra-frame prediction method is a method of predicting an uncoded pixel using an already coded pixel in a current frame by use of correlation in a video space. By quantizing a prediction residual with the intra-frame prediction method, spatial redundant information of a video can be effectively removed, and definition of video images can be improved.

When different video coding and decoding protocols are adopted for intra-frame prediction, the different video coding and decoding protocols correspond to different prediction modes. For example, the prediction modes supportable by the H.265 protocol or the High Efficiency Video Coding (HEVC) protocol include: a planar mode, a Dual Channel (DC) mode, and 33 angular modes. The prediction modes supportable by the H.266 protocol or the Versatile Video Coding (VVC) protocol include: a planar mode, a DC mode, and 65 angular modes.

Figure 1:
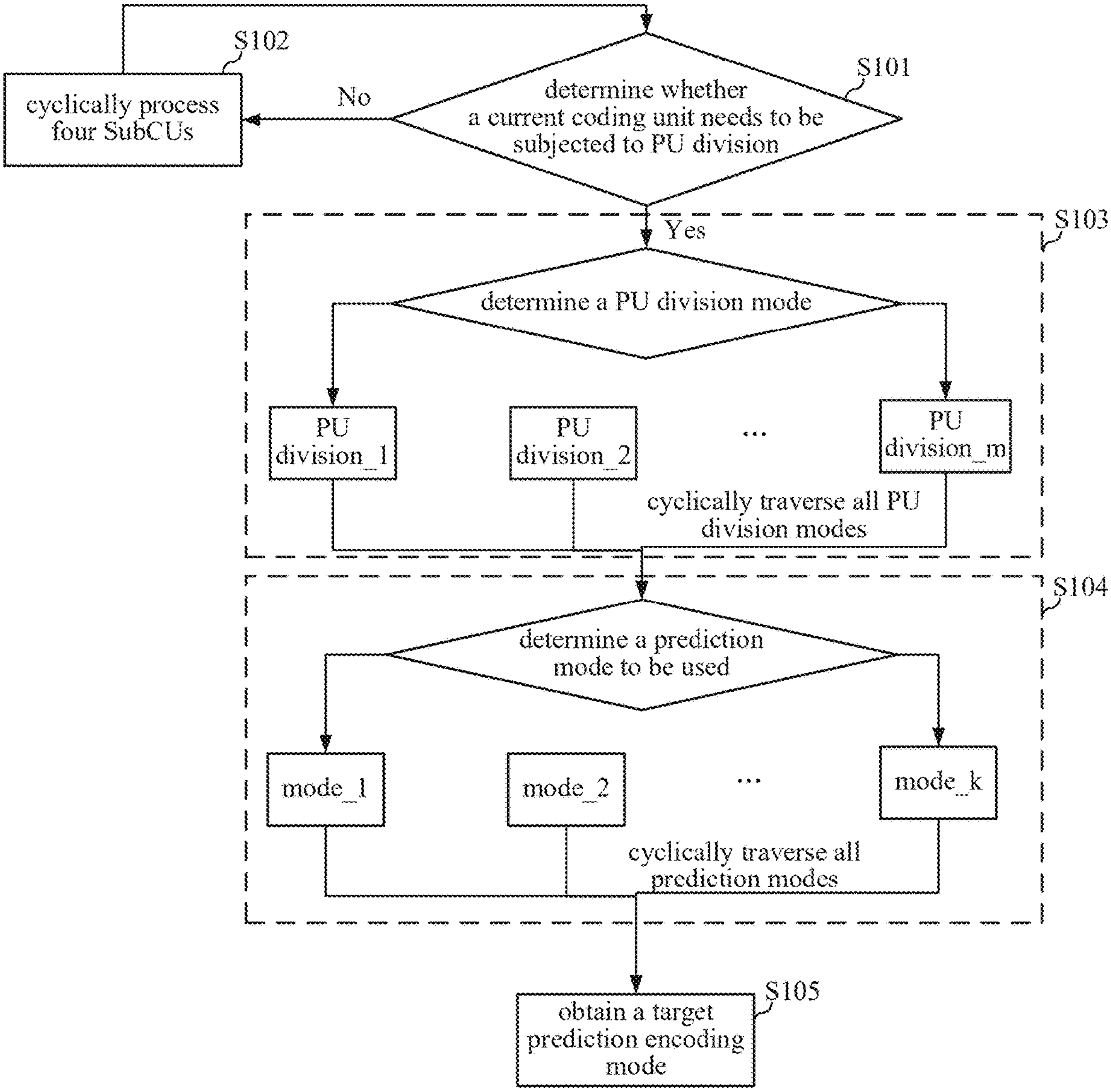
FIG. 1 is a schematic diagram illustrating an encoding process based on a video compression protocol according to the existing technology.

FIG. 1 is a schematic diagram illustrating an encoding process based on a video compression protocol according to the existing technology. The video compression protocol may include any one or more of the H.265 protocol, the HEVC protocol, the H.266 protocol, and the VVC protocol.

As shown in FIG. 1, a coding method based on the video compression protocol includes, but is not limited to, the following operations S101 to S105.

At operation S101, it is determined whether a current coding unit (CU) needs to be subjected to prediction unit (PU) division.

A CU is a part of a Coding Tree Unit (CTU); and a PU specifies all prediction modes of the CU, and all information related to prediction is defined in the PU. For example, the PU may include the following information: any one or more of a direction of intra-frame prediction, a division mode of inter-frame prediction, motion vector prediction, and a reference picture index of inter-frame prediction.

In a case where it is determined that the PU division is needed, operation S103 is performed; and in a case where it is determined that the PU division is not needed, operation S102 is performed.

At operation S102, four sub-coding units (SubCUs) are cyclically processed.

At operation S103, a PU division mode is determined.

There may be a plurality of PU division modes, such as PU division_1, PU division_2, . . . . PU division_m, with m denoting the number of the PU division modes and being an integer greater than or equal to 1.

It should be noted that all the PU division modes need to be traversed cyclically in the process of determining the PU division mode. After the PU division mode is selected, operation S104 is performed.

At operation S104, a prediction mode to be used is determined.

There are a plurality of prediction modes, such as mode_1, mode_2, . . . mode_k, with k denoting the number of the prediction modes and being an integer greater than or equal to 1.

It should be noted that all the prediction modes need to be traversed cyclically in the process of determining the prediction mode, so as to select the optimal prediction mode as a target prediction encoding mode.

At operation S105, a target prediction encoding mode is obtained.

For selecting the optimal prediction mode as the target prediction encoding mode, all the prediction modes need to be traversed at operation S103 and operation S104, so that the prediction process is complicated, which greatly increases computational complexity and prolongs processing time of video files.

The present disclosure provides an encoding mode prediction method and apparatus, an electronic device, and a storage medium, which are configured to optimize the selection process of the prediction mode at operation S104, so as to reduce time complexity of the conventional algorithm by which cyclic traversal is performed to search for the optimal prediction mode, and reduce processing time of images to be processed.

Figure 2:
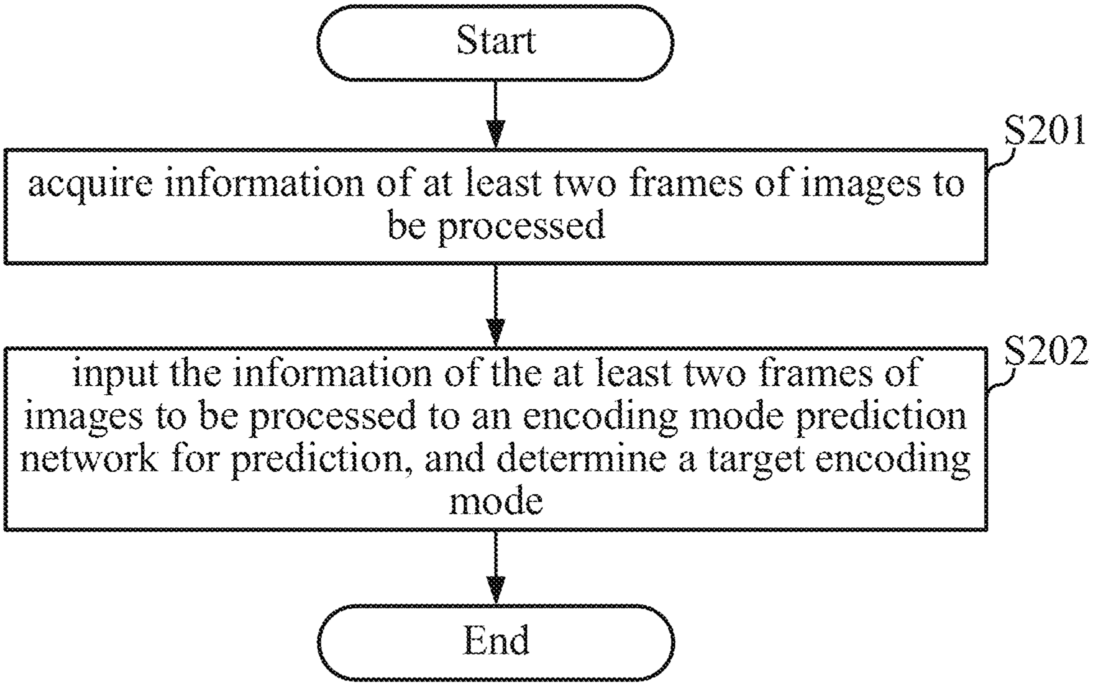
FIG. 2 is a schematic flowchart of an encoding mode prediction method according to an embodiment of the present disclosure.

FIG. 2 is a schematic flowchart of an encoding mode prediction method according to an embodiment of the present disclosure. The encoding mode prediction method is applicable to an encoding mode prediction apparatus. As shown in FIG. 2, the encoding mode prediction method according to the embodiment of the present disclosure includes, but is not limited to, the following operations S201 and S202.

At operation S201, information of at least two frames of images to be processed is acquired.

The at least two frames of images to be processed are at least two continuous frames of images.

At operation S202, the information of the at least two frames of images to be processed is input to an encoding mode prediction network for prediction, and a target encoding mode is determined.

The encoding mode prediction network is a network obtained by training a convolutional neural network based on multi-size pixel blocks, and the target encoding mode is used for coding and/or decoding of the images to be processed.

In the present embodiment, by acquiring the information of the at least two frames of images to be processed, the information of the images to be processed can be clarified, so that the at least two continuous frames of images to be processed can be easily processed later; by inputting the information of the at least two frames of images to be processed to the encoding mode prediction network for prediction and determining the target encoding mode, since the encoding mode prediction network is the network obtained by training the convolutional neural network based on the multi-size pixel blocks, the time complexity of the conventional algorithm by which cyclic traversal is performed to search for the optimal encoding mode can be reduced. Therefore, when the target encoding mode is used for coding and/or decoding of the images to be processed, the processing time of the images to be processed can be reduced, so that the images to be processes can obtain a high compression ratio, and coding efficiency of video images can be improved while ensuring image quality.

In some specific implementations, the information of the images to be processed includes at least one of pixel block information of the images to be processed, a prediction mode corresponding to the pixel block information, the number of prediction modes, and CU division information.

For example, the pixel block information of the images to be processed may include: a size of pixel blocks and whether the pixel blocks are already coded. For example, different identifiers may be used to represent a coded pixel block and a to-be-coded pixel block, so as to distinguish between the different pixel blocks and increase an image processing speed.

The number of prediction modes is a number determined based on the prediction modes supportable by different video coding and decoding protocols (e.g., the H.265 protocol, the HEVC protocol, theH.266 protocol, and the VVC protocol).

It should be noted that different pixel block information corresponds to different prediction modes. For example, the larger the pixel block size is, the greater the number of network layers of the desired encoding mode prediction network is, so as to ensure accuracy of the obtained prediction mode corresponding to the pixel block information.

For example, the at least two frames of images to be processed include: a first frame of image to be processed and a second frame of image to be processed. The first frame of image to be processed and the second frame of image to be processed are two continuous frames of images. The larger the pixel block size corresponding to the first frame of image to be processed is, the greater the number of network layers corresponding to the target encoding mode prediction network is; and the smaller the pixel block size corresponding to the second frame of image to be processed is, the smaller the number of network layers corresponding to the target encoding mode prediction network is.

In some specific implementations, inputting the information of the at least two frames of images to be processed to the encoding mode prediction network for prediction and determining the target encoding mode (i.e., operation S202) may be implemented in a following way: determining a pixel block size corresponding to the first frame of image to be processed according to acquired CTU information of the first frame of image to be processed; screening a plurality of encoding mode prediction networks according to the pixel block size corresponding to the first frame of image to be processed to obtain a target encoding mode prediction network; and inputting the information of the first frame of image to be processed and the information of the second frame of image to be processed to the target encoding mode prediction network for prediction, and determining the target encoding mode.

The CTU information is configured to represent coding complexity corresponding to the first frame of image to be processed, and the target encoding mode prediction network is matched with the pixel block size corresponding to the first frame of image to be processed.

It should be noted that, the finer the division of the first frame of image to be processed in the CTU information is, the higher the coding complexity corresponding to the first frame of image to be processed is. Which encoding mode prediction network is desired to be selected for the prediction of the first frame of image to be processed may be determined according to the pixel block size corresponding to the first frame of image to be processed, so that the obtained target encoding mode prediction network can meet processing requirements of the first frame of image to be processed, thereby achieving accurate prediction for the first frame of image to be processed while increasing the image processing speed. Moreover, encoding mode prediction is performed on the second frame of image to be processed with the target encoding mode prediction network to determine whether a coded image meets requirements of the second frame of image to be processed, so as to make the determined target encoding mode accurate.

In some specific implementations, determining the pixel block size corresponding to the first frame of image to be processed according to the acquired CTU information of the first frame of image to be processed includes: determining the pixel block size corresponding to the first frame of image to be processed according to at least one of the number of CUs, the number of PUs, and the number of Transform Units (TUs) which correspond to the first frame of image to be processed.

A CU is a basic unit for prediction, transformation, quantization, and entropy coding, a PU is a basic unit for intra-frame prediction and/or inter-frame prediction, and a TU is a basic unit for transformation and quantization. By separating the three units, each of processing operations of transformation, prediction, and coding corresponding to the images to be processed can be flexible, division of the processing operations can accord with texture features of the video images, and optimization of coding performance can be ensured.

Texture complexity corresponding to the first frame of image to be processed can be represented by at least one of the number of CUs, the number of PUs, and the number of TUs which correspond to the first frame of image to be processed, so that the pixel block size corresponding to the first frame of image to be processed may be determined according to different texture complexities.

In some specific implementations, the CTU information of the first frame of image to be processed includes: CUs and the number of the CUS.

Screening the plurality of encoding mode prediction networks according to the pixel block size corresponding to the first frame of image to be processed to obtain the target encoding mode prediction network includes: according to the number of the CUS, a division mode of each CU, and information of coded pixel blocks in each CU, performing cluster analysis on prediction encoding modes corresponding to the to-be-coded pixel blocks in each CU to obtain an analysis result; and determining the target encoding mode prediction network according to the analysis result.

The prediction encoding modes are based on pixel points, and the analysis result includes: a prediction encoding mode based on currently predicted pixel blocks. The cluster analysis may be statistical clustering of pixel point-based prediction encoding modes output by the encoding mode prediction networks, so as to obtain the prediction encoding modes of the pixel blocks to be predicted.

In a specific implementation, all the CUs may be cyclically processed based on the number of the CUs to classify the prediction encoding modes corresponding to the to-be-coded pixel blocks in each CU according to the division mode of each CU and the information of the coded pixel blocks in each CU, so as to enable the obtained analysis result to represent classifications of the prediction encoding modes, thereby determining the target encoding mode prediction network based on the analysis result.

In some specific implementations, the analysis result includes: occurrence numbers of the prediction encoding modes corresponding to the to-be-coded pixel blocks in the CU. Determining the target encoding mode prediction network according to the analysis result includes: sorting the occurrence numbers of the prediction encoding modes corresponding to the to-be-coded pixel blocks in the CU to obtain a sorting result; and determining the target encoding mode prediction network according to the sorting result.

For example, the prediction encoding modes corresponding to the to-be-coded pixel blocks in the CU include: a first prediction encoding mode, a second prediction encoding mode, and a third prediction encoding mode. Correspondingly, the occurrence number of the first prediction encoding mode is 3, the occurrence number of the second prediction encoding mode is 2, and the occurrence number of the third prediction encoding mode is 5. By sorting the above occurrence numbers, it can be seen that the occurrence number of the third prediction encoding mode is the maximum (i.e., 5), then the encoding mode prediction network corresponding to the third prediction encoding mode may be taken as the target encoding mode prediction network. In this way, the target encoding mode prediction network can be determined quickly and accurately, and a speed of acquiring the prediction network can be increased.

In some specific implementations, before acquiring the information of the at least two frames of images to be processed (i.e., operation S201), the method further includes: training the convolutional neural network according to a plurality of sample images and a plurality of preset pixel block sizes to obtain a plurality of encoding mode prediction networks corresponding to the plurality of preset pixel block sizes.

The preset pixel block sizes may include any one or more of: a size corresponding to image resolution of 8×8, a size corresponding to image resolution of 16×16, a size corresponding to image resolution of to 32×32, and a size corresponding to image resolution of 64×64. The above sizes are merely examples for illustrating the preset pixel block sizes, the preset pixel block sizes may be specifically set according to actual needs, and the other preset pixel block sizes not described herein are also within the range of the present disclosure and will not be described in detail here.

By respectively training the convolutional neural network with the plurality of sample images based on the plurality of different preset pixel block sizes, the plurality of encoding mode prediction networks corresponding to the plurality of preset pixel block sizes can be obtained, so that the encoding mode prediction networks corresponding to different pixel block sizes can be easily screened out in an encoding mode predication process of the images, so as to increase prediction speeds corresponding to different pixel block sizes and also increase the image processing speed.

In some specific implementations, training the convolutional neural network according to the plurality of sample images and the plurality of preset pixel block sizes to obtain the plurality of encoding mode prediction networks corresponding to the plurality of preset pixel block sizes includes: screening the plurality of sample images according to the plurality of preset pixel block sizes to obtain a plurality of to-be-tested sample image sets; and inputting to-be-tested sample images in the plurality of to-be-tested sample image sets to the convolutional neural network for training to obtain the plurality of encoding mode prediction networks corresponding to the plurality of preset pixel block sizes.

A plurality of to-be-tested sample images in a same to-be-tested sample image set correspond to a same pixel block size, and the to-be-tested sample images in different to-be-tested sample image sets correspond to different pixel block sizes.

It should be noted that one to-be-tested sample image set corresponds to the encoding mode prediction network for one pixel block size, the plurality of encoding mode prediction networks are obtained based on the number of the preset pixel block sizes, and the number of the obtained encoding mode prediction networks is the same as the number of the preset pixel block sizes.

For example, the number of the preset pixel block sizes is 4, and the preset pixel block sizes specifically include: 8×8, 16×16, 32×32, and 64×64. Correspondingly, four to-be-tested sample image sets may be obtained by screening the plurality of sample images, and each to-be-tested sample image set includes a plurality of to-be-tested sample images.

For example, the preset pixel block size corresponding to the first to-be-tested sample image set is 8×8; the preset pixel block size corresponding to the second to-be-tested sample image set is 16×16; the preset pixel block size corresponding to the third to-be-tested sample image set is 32×32; and the preset pixel block size corresponding to the fourth to-be-tested sample image set is 64×64. The four to-be-tested sample image sets are respectively input to the convolutional neural network (e.g., any one of a Residual Convolutional Neural Network (Res-CNN), a Transformer network, and a Generative Adversarial Network (GAN)) for training to obtain four encoding mode prediction networks, which are, for example, an encoding mode prediction network corresponding to the preset pixel block size of 8×8, an encoding mode prediction network corresponding to the preset pixel block size of 16×16, an encoding mode prediction network corresponding to the preset pixel block size of 32×32, and an encoding mode prediction network corresponding to the preset pixel block size of 64×64. Thus, the different encoding mode prediction networks can be suitable for the different pixel block sizes, and adaptability to images with different pixel block sizes can be improved.

In some specific implementations, inputting the to-be-tested sample images in the plurality of to-be-tested sample image sets to the convolutional neural network for training to obtain the plurality of encoding mode prediction networks corresponding to the plurality of preset pixel block sizes includes: respectively processing each to-be-tested sample image set as follows: inputting the to-be-tested sample images in the to-be-tested sample image set to the convolutional neural network for training to obtain a to-be-verified encoding mode prediction network; and in a case where an output result of the to-be-verified encoding mode prediction network meets a preset condition, obtaining the encoding mode prediction network corresponding to the preset pixel block size.

It should be noted that the process of inputting the to-be-tested sample images in the to-be-tested sample image set to the convolutional neural network for training is performed cyclically; and if it is determined that the output result of the to-be-verified encoding mode prediction network does not meet the preset condition, the training for the convolutional neural network needs to be continued until the output result of the to-be-verified encoding mode prediction network meets the preset condition, thereby obtaining the encoding mode prediction network corresponding to the preset pixel block size.

The preset condition is a test condition set in advance. For example, a verification image may be coded based on a to-be-verified prediction encoding mode output by the to-be-verified encoding mode prediction network, so as to obtain a to-be-verified coded image; and if image quality of the to-be-verified coded image meets use requirements of a user or a peak signal-to-noise ratio (PSNR) of the to-be-verified coded image is within a range of a preset signal-to-noise ratio threshold, it is determined that the output result of the to-be-verified encoding mode prediction network meets the preset condition.

In some specific implementations, the output result of the to-be-verified encoding mode prediction network includes: probability values of prediction modes of pixel points corresponding to an output image and the number of preset encoding modes supported by a preset coding protocol.

In a case where it is determined that the output result of the to-be-verified encoding mode prediction network meets the preset condition, obtaining the encoding mode prediction network corresponding to the preset pixel block size includes: calculating a loss value according to the probability values of the prediction modes of the pixel points corresponding to the output image and the number of the preset encoding modes supported by the preset coding protocol; and in a case where it is determined that the loss value is within a range of a preset loss threshold, obtaining the encoding mode prediction network corresponding to the preset pixel block size.

The loss value is configured to represent a multi-class cross entropy loss in the convolutional neural network. The loss value may be also configured to measure similarity between distribution of real labels and distribution of predicted labels obtained by the trained encoding mode prediction network.

For example, the loss value may be calculated by the following formula:

$$\text{loss} = -\sum_{i=1}^{C} p(x_i) * \log(p(x_i))$$

where C denotes the number of the preset encoding modes supported by the preset coding protocol; $p(x_i)$ denotes the probability values of the prediction modes of the pixel points corresponding to the output image (e.g., the probability value of the prediction mode of each pixel point in a pixel block X in the output image); and loss denotes the loss value configured to represent a multi-class cross entropy loss in an Res-CNN.

In a case where it is determined that the loss value is within the range of the preset loss threshold, the training for the convolutional neural network is stopped, and the encoding mode prediction network corresponding to the preset pixel block size is obtained, so as to adapt to prediction requirements of different pixel block sizes.

Figure 3:
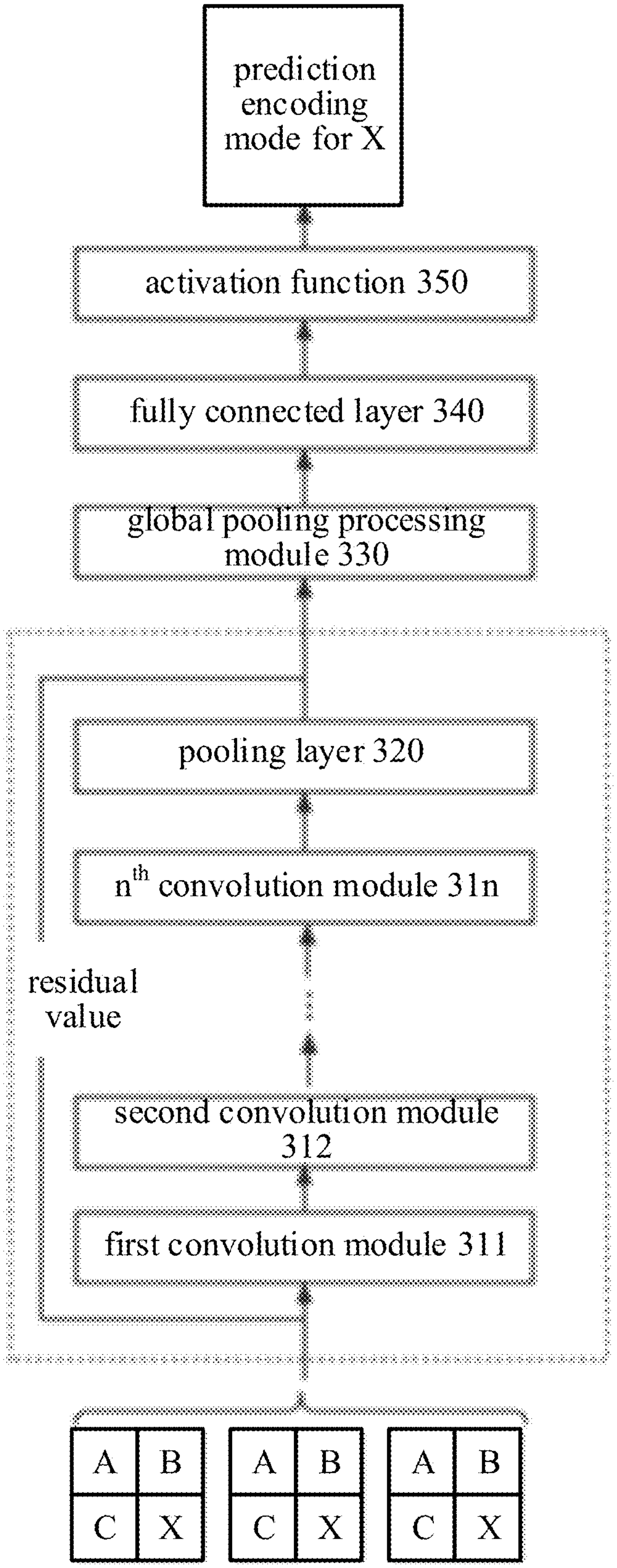
FIG. 3 is a schematic diagram of a network structure of a Res-CNN according to an embodiment of the present disclosure.

For example, FIG. 3 is a schematic diagram of a network structure of a Res-CNN according to an embodiment of the present disclosure. As shown in FIG. 3, the network structure of the Res-CNN includes, but is not limited to: a first convolution module 311, a second convolution module 312, . . . an $n^{th}$ convolution module 31*n*; a pooling layer 320; a global pooling processing module 330, a fully connected layer 340, and an activation function 350. n denotes the number of the convolution modules and is an integer greater than or equal to 1. Each of A, B, C in FIG. 3 denotes a coded pixel block, and X denotes a to-be-predicted pixel block.

Input parameters of the first convolution module 311 include, but are not limited to: image information of the coded pixel block A (and/or the coded pixel block B and/or the coded pixel block C), CU division information, and prediction mode information corresponding to the coded pixel block A (and/or the coded pixel block B and/or the coded pixel block C).

Figure 4:
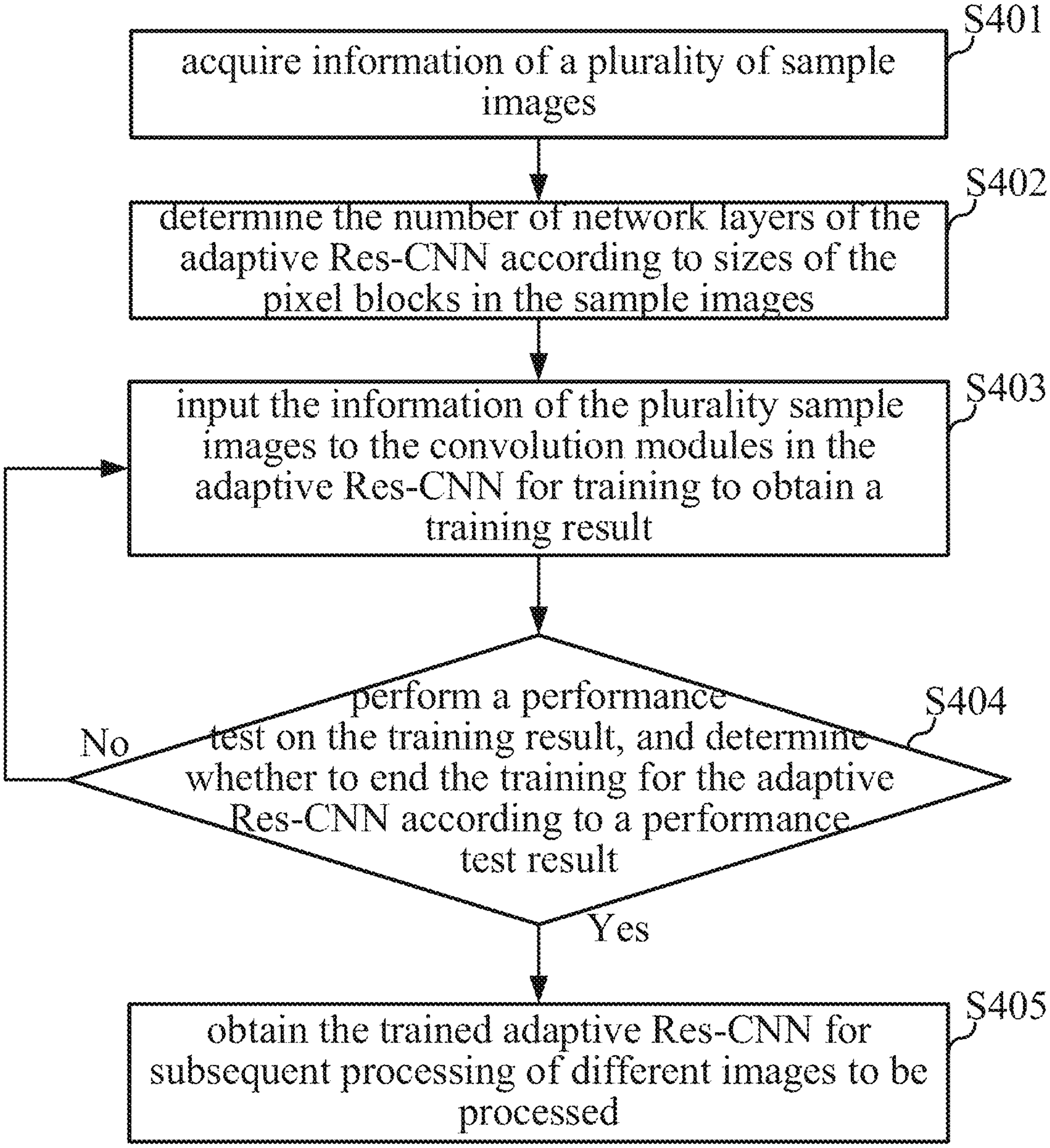
FIG. 4 is a flowchart of a method for training Res-CNN by using sample images according to an embodiment of the present disclosure.

FIG. 4 is a flowchart of a method for training Res-CNN by using sample images according to an embodiment of the present disclosure. As shown in FIG. 4, the method for training the Res-CNN by using the sample images includes, but is not limited to, the following operations S401 to S405.

At operation S401, information of a plurality of sample images is acquired.

The information of the sample images may include: information of pixel blocks (e.g., the coded pixel block A/the coded pixel block B/the coded pixel block C and the to-be-predicted pixel block X) of the plurality of sample images. With the information of the multiple pixel blocks of the plurality of sample images, prediction accuracy of a prediction encoding mode of the to-be-predicted pixel block X can be improved.

At operation S402, the number of network layers of the adaptive Res-CNN is determined according to sizes of the pixel blocks in the sample images.

Adaptive regulation of the number of the network layers of the adaptive Res-CNN may be performed according to an input size of at least one of the coded pixel block A, the coded pixel block B, and input coded pixel block C. For example, the size of the pixel block may be 8×8, 16×16, 32×32 or 64×64. The above sizes are merely examples for illustrating the size of the pixel blocks, the size of the pixel blocks may be specifically set according to actual needs, and the other sizes of the pixel blocks not described herein are also within the range of the present disclosure and will not be described in detail here.

It should be noted that the larger the size of the pixel blocks in the sample images is, the greater the number of the network layers corresponding to the adaptive Res-CNN is, so as to capture characteristic information of the large-size pixel blocks; and the smaller the size of the pixel blocks in the sample images is, the smaller the number of the network layers corresponding to the adaptive Res-CNN is, so that computational consumption caused by an increase in the pixel blocks can be counteracted while ensuring a training effect.

At operation S403, the information of the plurality sample images is input to the convolution modules in the adaptive Res-CNN for training to obtain a training result.

As shown in FIG. 3, the information of the coded pixel block A, the information of the coded pixel block B, the information of the coded pixel block C, and the information of the to-be-predicted pixel block X are sequentially input to the first convolution module 311, the second convolution modules 312, . . . and the $n^{th}$ convolution module 31*n* for convolution operation to obtain a convolution processing result; the convolution processing result is input to the pooling layer 320 for pooling to obtain a pooling result and a residual value; determination is performed based on the residual value to obtain a determination result; it is determined, according to the determination result, whether to feed back the pooling result to the first convolution module 311 for cyclic processing; if it is determined that the cyclic processing is not needed, the pooling result output by the pooling layer 320 is input to the global pooling processing module 330, the fully connected layer 340, and the activation function 350 for processing in sequence, thereby obtaining a training result.

At operation S404, a performance test is performed on the training result, and it is determined whether to end the training for the adaptive Res-CNN according to a performance test result.

If the performance test result meets a preset test index, it is determined that the training for the adaptive Res-CNN may be ended; and if the performance test result fails to meet the preset test index, the training for the adaptive Res-CNN needs to be continued.

For example, the training result includes: a prediction encoding mode of the to-be-predicted pixel block X. The to-be-predicted pixel block X is coded in the prediction encoding mode to obtain a coding result, and it is determined that the training for the adaptive Res-CNN may be ended in a case where the coding result meets a preset coding requirement.

In a case where it is determined that the training for the adaptive Res-CNN may be ended, operation S405 is performed; and in a case where it is determined that the training for the adaptive Res-CNN needs to be continued, operation S403 is performed.

At operation S405, the trained adaptive Res-CNN is obtained for subsequent processing of different images to be processed.

In the present embodiment, by respectively training the Res-CNN with the plurality of sample images corresponding to the plurality of different preset pixel block sizes, a plurality of adaptive Res-CNNs corresponding to the plurality of preset pixel block sizes can be obtained, so that different images to be processed can be processed based on the trained adaptive Res-CNNs in encoding mode prediction processes of the images, which can increase prediction speeds of the different images to be processed and also increase the image processing speed.

Figure 5:
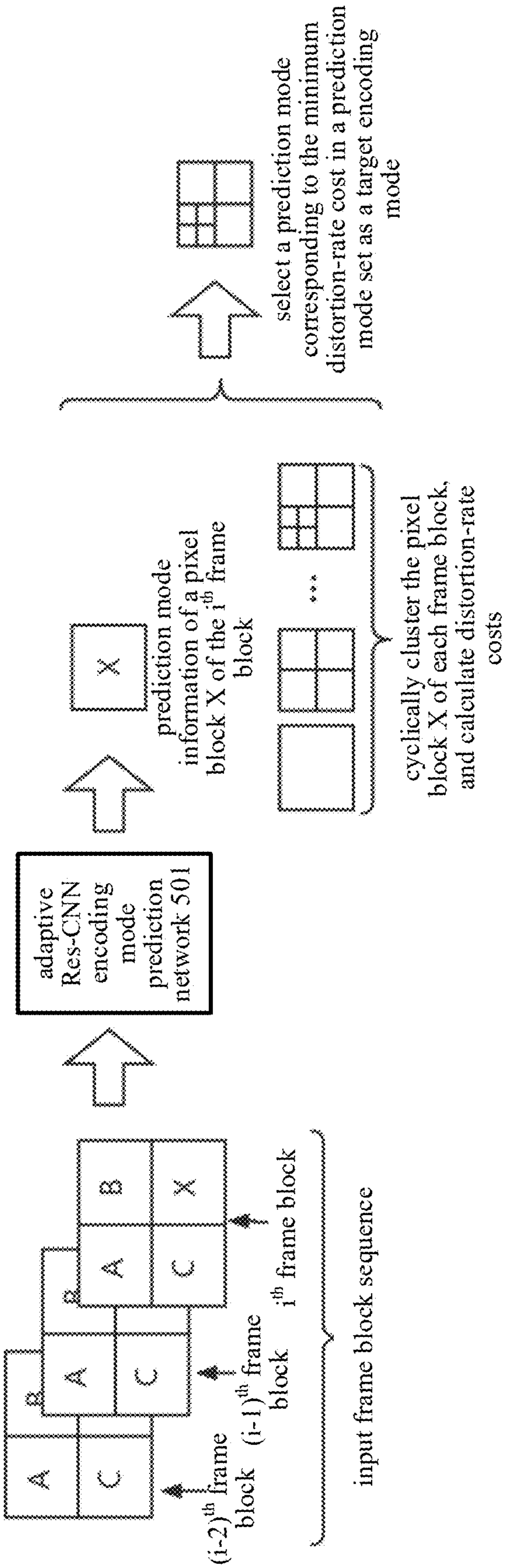
FIG. 5 is a flowchart of an encoding mode prediction method based on Res-CNN according to an embodiment of the present disclosure.

FIG. 5 is a flowchart of an encoding mode prediction method based on Res-CNN according to an embodiment of the present disclosure. As shown in FIG. 5, an input frame block sequence is input to an adaptive Res-CNN encoding mode prediction network 501 for prediction, thereby obtaining prediction mode information of a pixel block X of an $i^{th}$ frame block; and then, the pixel block X of each frame block is cyclically clustered, and distortion-rate costs are calculated, so that a prediction mode corresponding to the minimum distortion-rate cost in a prediction mode set may be selected as a target encoding mode.

The input frame block sequence includes: an $(i-2)^{th}$ frame block, an $(i-1)^{th}$ frame block, and an $i^{th}$ frame block, with i being an integer greater than or equal to 2, and each frame block includes a coded pixel block A, a coded pixel block B, a coded pixel block C, and a to-be-coded pixel block X.

It should be noted that the adaptive Res-CNN encoding mode prediction network 501 can automatically select the number of network layers corresponding to a corresponding Res-CNN according to a size of the input frame blocks; and the larger the size of the frame blocks is, the greater the number of the network layers corresponding to the Res-CNN is.

By cyclically traversing all CU division modes corresponding to the to-be-coded pixel block X and calculating a distortion-rate cost for each CU division mode, the prediction mode set including a plurality of prediction modes may be obtained; and then, the plurality of prediction modes in the prediction mode set are sorted based on the distortion-rate costs to obtain the prediction mode corresponding to the minimum distortion-rate cost, the prediction mode corresponding to the minimum distortion-rate cost is taken as the target encoding mode, and the CU division mode corresponding to the target encoding mode is obtained, thereby realizing quick prediction of the prediction encoding modes, reducing image processing time, and improving coding efficiency.

Figure 6:
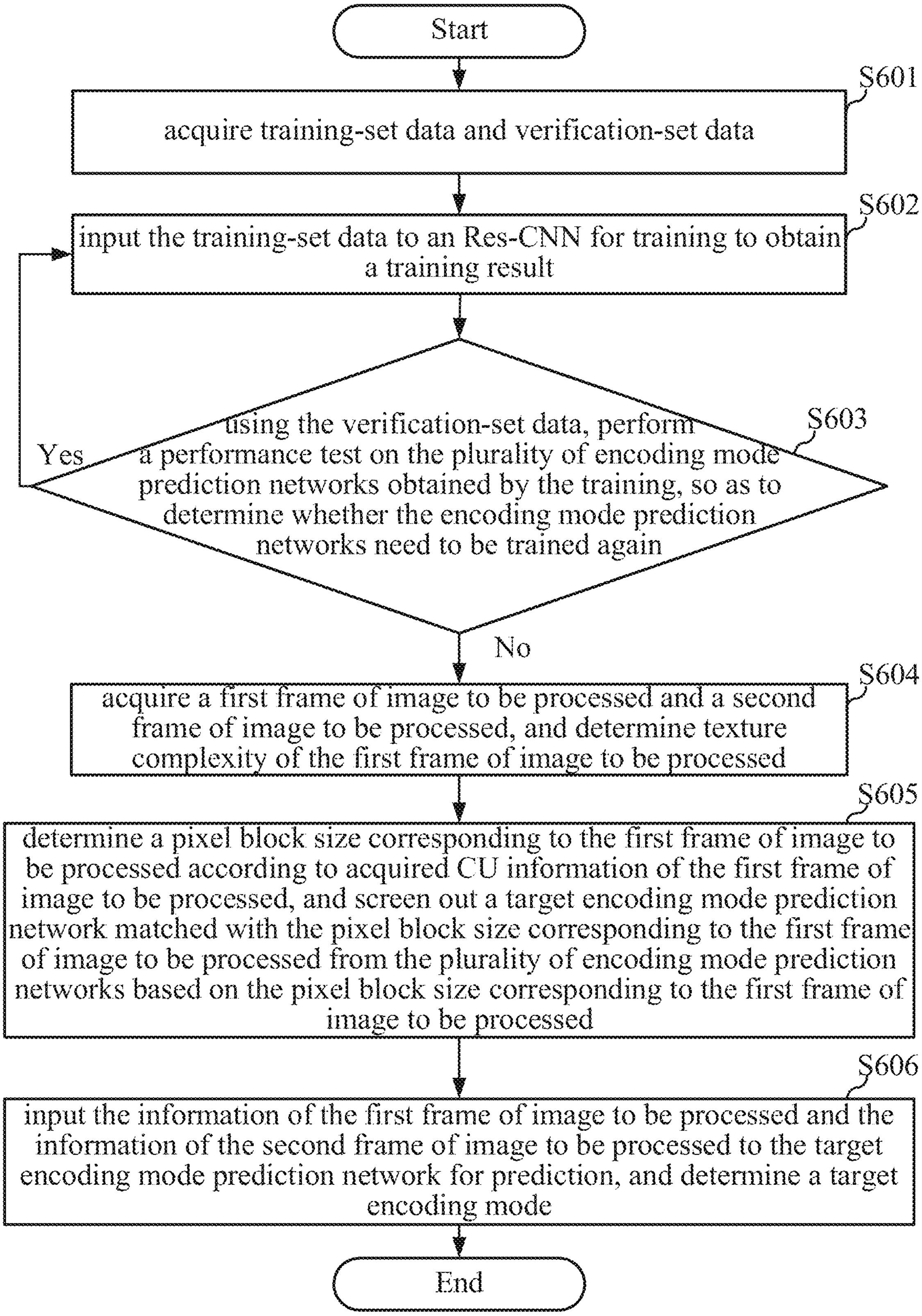
FIG. 6 is another schematic flowchart of an encoding mode prediction method according to an embodiment of the present disclosure.

FIG. 6 is another schematic flowchart of an encoding mode prediction method according to an embodiment of the present disclosure. As shown in FIG. 6, the encoding mode prediction method includes, but is not limited to, the following operations S601 to S606.

At operation S601, training-set data and verification-set data are acquired.

The training-set data includes a plurality of sample images. Each sample image includes a plurality of pixel blocks, and each pixel block has a different size (for example, the size of the pixel block is 64×64 or 32×32). The verification-set data includes to-be-verified images, and each to-be-verified image includes a plurality of to-be-verified pixel blocks.

For example, the plurality of sample images are screened according to a plurality of preset pixel block sizes to obtain a plurality of to-be-tested sample image sets; and a plurality of to-be-tested sample images in a same to-be-tested sample image set correspond to a same pixel block size, and the to-be-tested sample images in different to-be-tested sample image sets correspond to different pixel block sizes.

It should be noted that a size of a pixel block is determined by texture complexity of the pixel block. For example, if a certain pixel block has higher texture complexity, a size of the pixel block is larger; conversely, if a certain pixel block has lower texture complexity, a size of the pixel block is smaller. The texture complexity of the pixel block may be determined according to at least one of the number of CUs, the number of PUs, and the number of TUs which correspond to the pixel block. The larger the size of the pixel block is, the greater the number of layers of a neural network to be trained is.

At operation S602, the training-set data is input to an Res-CNN for training to obtain a training result.

The training-set data may further include at least one of pixel block information (e.g., a pixel value corresponding to a coded pixel block A, a pixel value corresponding to a coded pixel block B, and a pixel value corresponding to a coded pixel block C) of images to be processed, a prediction mode corresponding to the pixel block information, the number of prediction modes, and CU division information. The images to be processed include at least two continuous frames of images.

The Res-CNN may include a plurality of different convolution modules (for example, FIG. 3 shows the n convolution blocks 311 to 31*n*), and each convolution module corresponds to a different convolution kernel.

The network structure shown in FIG. 3 is adopted to represent the composition of the Res-CNN. According to different sizes of input pixel blocks, Res-CNNs with different numbers of network layers are trained correspondingly. During the training, the training-set data needs to be processed by the convolution modules (e.g., the first convolution module 311 and the second convolution module 312) having different convolution kernels, the pooling layer 320, the global pooling processing module 330, the fully connected layer 340, and the activation function 350 to obtain output data, and a size of an output pixel block X corresponding to the output data may be expressed as W*H*C.

W denotes a length of the output pixel block X, H denotes a width of the output pixel block X, and C denotes the number of prediction modes supported by a current protocol.

Further, a probability value $p(x_i)$ of a prediction mode of each pixel point in the output pixel block X needs to be calculated; and for each pixel, a prediction encoding mode corresponding to the maximum probability value is selected. For example, multi-class cross entropy may be taken as a loss formula of the Res-CNN, and may be expressed by the following formula:

$$\text{loss} = -\sum_{i=1}^{C} p(x_i) * \log(p(x_i))$$

where C denotes the number of the prediction modes supported by the current protocol; p(xi) denotes the probability value of the prediction mode of each pixel point in the output pixel block X; and loss denotes a loss value configured to represent a multi-class cross entropy loss in the Res-CNN.

In a case where it is determined that the loss value is within a range of a preset loss threshold, the training for the Res-CNN is ended, and a training result is obtained. The training result may include a plurality of encoding mode prediction networks, and each encoding mode prediction network corresponds to a different pixel block size, so as to adapt to prediction requirements of different pixel block sizes.

It should be noted that different training-set data correspond to different pixel block sizes, but all pixel blocks in each training-set data correspond to a same size. When the Res-CNN is trained, the Res-CNN needs to be trained respectively according to the different pixel block sizes, so as to obtain the plurality of encoding mode prediction networks.

At operation S603, a performance test is performed, using the verification-set data, on the plurality of encoding mode prediction networks obtained by the training, so as to determine whether the encoding mode prediction networks need to be trained again.

The verification-set data includes a plurality of to-be-verified images.

For example, an Artificial Intelligence (AI) divider is used to divide the verification-set data to obtain a plurality of to-be-verified images having different pixel block sizes, and the to-be-verified images having the different pixel block sizes are input to the encoding mode prediction networks corresponding to the different pixel block sizes for verification; in a case where it is determined that coded images obtained by encoding the images with output target encoding modes meet a preset coding quality requirement, it is determined that the encoding mode prediction networks do not need to be trained again, thereby obtaining the trained encoding mode prediction networks; and in a case where it is determined that the coded images obtained by encoding the images with the output target encoding modes do not meet the preset coding quality requirement, operation S602 is performed to continue to train the encoding mode prediction networks.

The preset encoding quality requirement may include at least one of a PSNR, an image similarity, and an encoding speed.

At operation S604, a first frame of image to be processed and a second frame of image to be processed are acquired, and texture complexity of the first frame of image to be processed is determined.

For example, the texture complexity of the first frame of image to be processed may be determined according to the number of CUs, the number of PUs, and the number of TUs which correspond to the first frame of image to be processed.

At operation S605, a pixel block size corresponding to the first frame of image to be processed is determined according to acquired CU information of the first frame of image to be processed, and a target encoding mode prediction network matched with the pixel block size corresponding to the first frame of image to be processed is screened out from the plurality of encoding mode prediction networks based on the pixel block size corresponding to the first frame of image to be processed.

The pixel block size corresponding to the target encoding mode prediction network is the same as the pixel block size of the first frame of image to be processed.

At operation S606, the information of the first frame of image to be processed and the information of the second frame of image to be processed are input to the target encoding mode prediction network for prediction, and a target encoding mode is determined.

Cluster analysis (for example, occurrence numbers of prediction encoding modes corresponding to a to-be-coded pixel block in a CU are counted and sorted) may be performed on prediction encoding modes corresponding to a to-be-coded pixel block X in each CU based on the number of CUs in the first frame of image to be processed, a division mode of each CU, and information of coded pixel blocks (e.g., a coded pixel block A, a coded pixel block B, and a coded pixel block C) in each CU, so as to obtain an analysis result, which includes: a prediction encoding mode with the maximum occurrence number in the prediction encoding modes corresponding to the to-be-coded pixel block.

Further, distortion-rate costs may be calculated, and a target encoding mode corresponding to the minimum distortion-rate cost which is output by the target encoding mode prediction network is selected.

A distortion-rate cost represents correlation between an image distortion degree and a coding rate. A PSNR between an original image and a coded and reconstructed image may be used to measure the image distortion degree, and the PSNR may be a luminance PSNR or a linear combination of the luminance PSNR and a chrominance PSNR.

The PSNR represents a ratio of power of a peak signal to power of a noise signal, the peak signal is configured to represent the maximum pixel value of an image (e.g., the maximum value of pixel brightness), and the noise signal is configured to represent a mean square error (e.g., a mean of squares of differences) of pixel values of the original image and the reconstructed image.

In some specific implementations, the target encoding mode may be identified with a label. For example, a prediction mode label is used to represent the target encoding mode, i.e., the target encoding mode corresponding to the minimum distortion-rate cost which is output by the target encoding mode prediction network.

In the present embodiment, by training the Res-CNN based on deep learning to obtain the encoding mode prediction networks for the plurality of different sizes, when encoding mode prediction is performed for the different pixel block sizes, the target encoding mode prediction network corresponding to the pixel block size can be selected based on the pixel block size for prediction, so that the obtained target encoding modes can correspond to small distortion-rate costs, that is, a high compression ratio is achieved in video transmission. In addition, compared with the conventional algorithm involving cyclic traversal, the method provided in the present embodiment can reduce the time complexity in searching for the optimal prediction encoding mode, and can improve the coding efficiency of video images while ensuring the image quality.

Figure 7:
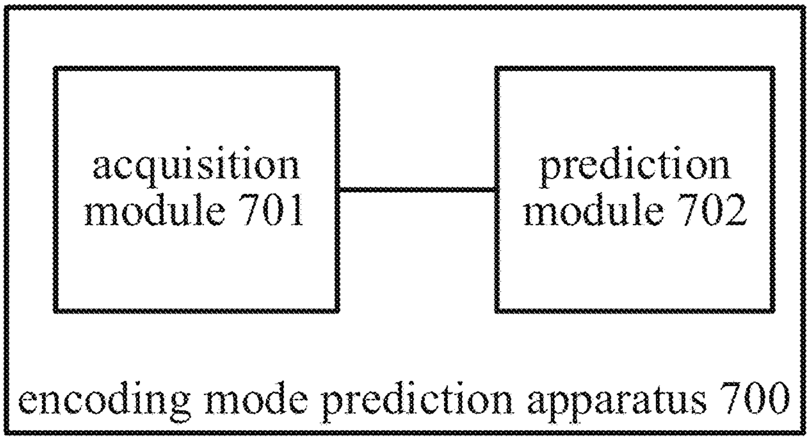
FIG. 7 is a block diagram of an encoding mode prediction apparatus according to an embodiment of the present disclosure.

FIG. 7 is a block diagram of an encoding mode prediction apparatus according to an embodiment of the present disclosure. As shown in FIG. 7, the encoding mode prediction apparatus 700 includes, but is not limited to, an acquisition module 701 and a prediction module 702.

The acquisition module 701 is configured to acquire information of at least two frames of images to be processed, with the at least two frames of images to be processed being at least two continuous frames of images.

The prediction module 702 is configured to input the information of the at least two frames of images to be processed to an encoding mode prediction network for prediction, and determine a target encoding mode, with the encoding mode prediction network being a network obtained by training a convolutional neural network based on multi-size pixel blocks, and the target encoding mode being used for coding and/or decoding of the images to be processed.

In some specific implementations, the two frames of images to be processed include: a first frame of image to be processed and a second frame of image to be processed, and the prediction module 702 is specifically configured to: determine a pixel block size corresponding to the first frame of image to be processed according to acquired CTU information of the first frame of image to be processed, with the CTU information configured to represent coding complexity corresponding to the first frame of image to be processed; screen a plurality of encoding mode prediction networks according to the pixel block size corresponding to the first frame of image to be processed to obtain a target encoding mode prediction network, with the target encoding mode prediction network matched with the pixel block size corresponding to the first frame of image to be processed; and input the information of the first frame of image to be processed and the information of the second frame of image to be processed to the target encoding mode prediction network for prediction, and determining the target encoding mode.

In some specific implementations, the larger the pixel block size corresponding to the first frame of image to be processed is, the greater the number of network layers corresponding to the target encoding mode prediction network is.

In some specific implementations, determining the pixel block size corresponding to the first frame of image to be processed according to the acquired CTU information of the first frame of image to be processed includes: determining the pixel block size corresponding to the first frame of image to be processed according to at least one of the number of CUs, the number of PUs, and the number of TUs which correspond to the first frame of image to be processed.

In some specific implementations, the CTU information of the first frame of image to be processed includes: CUs and the number of the CUS, and screening the plurality of encoding mode prediction networks according to the pixel block size corresponding to the first frame of image to be processed to obtain the target encoding mode prediction network includes: performing cluster analysis on prediction encoding modes corresponding to to-be-coded pixel blocks in each CU according to the number of the CUS, a division mode of each CU, and information of the coded pixel blocks in each CU to obtain an analysis result; and determining the target encoding mode prediction network according to the analysis result.

In some specific implementations, the analysis result includes: occurrence numbers of the prediction encoding modes corresponding to the to-be-coded pixel blocks in the CU, and determining the target encoding mode prediction network according to the analysis result includes: sorting the occurrence numbers of the prediction encoding modes corresponding to the to-be-coded pixel blocks in the CU to obtain a sorting result; and determining the target encoding mode prediction network according to the sorting result.

In some specific implementations, the encoding mode prediction apparatus 700 further includes a training module (not shown), which is configured to train the convolutional neural network according to a plurality of sample images and a plurality of preset pixel block sizes to obtain a plurality of encoding mode prediction networks corresponding to the plurality of preset pixel block sizes.

In some specific implementations, training the convolutional neural network according to the plurality of sample images and the plurality of preset pixel block sizes to obtain the plurality of encoding mode prediction networks corresponding to the plurality of preset pixel block sizes includes: screening the plurality of sample images according to the plurality of preset pixel block sizes to obtain a plurality of to-be-tested sample image sets, with a plurality of to-be-tested sample images in a same to-be-tested sample image set corresponding to a same pixel block size, and to-be-tested sample images in different to-be-tested sample image sets corresponding to different pixel block sizes; and inputting the to-be-tested sample images in the plurality of to-be-tested sample image sets to the convolutional neural network for training to obtain the plurality of encoding mode prediction networks corresponding to the plurality of preset pixel block sizes.

In some specific implementations, inputting the to-be-tested sample images in the plurality of to-be-tested sample image sets to the convolutional neural network for training to obtain the plurality of encoding mode prediction networks corresponding to the plurality of preset pixel block sizes includes: respectively processing each to-be-tested sample image set as follows: inputting the to-be-tested sample images in the to-be-tested sample image set to the convolutional neural network for training to obtain a to-be-verified encoding mode prediction network; and in a case where an output result of the to-be-verified encoding mode prediction network meets a preset condition, obtaining an encoding mode prediction network corresponding to a preset pixel block size.

In some specific implementations, the output result of the to-be-verified encoding mode prediction network includes: probability values of prediction modes of pixel points corresponding to an output image and a number of preset encoding modes supported by a preset coding protocol, and in a case where it is determined that the output result of the to-be-verified encoding mode prediction network meets the preset condition, obtaining the encoding mode prediction network corresponding to the preset pixel block size includes: calculating a loss value according to the probability values of the prediction modes of the pixel points corresponding to the output image and the number of the preset encoding modes supported by the preset coding protocol, with the loss value configured to represent a multi-class cross entropy loss in the convolutional neural network; and in a case where it is determined that the loss value is within a range of a preset loss threshold, obtaining the encoding mode prediction network corresponding to the preset pixel block size.

In some specific implementations, the information of the images to be processed includes at least one of pixel block information of the images to be processed, a prediction mode corresponding to the pixel block information, the number of prediction modes, and CU division information.

It should be noted that the encoding mode prediction apparatus 700 provided in the present embodiment can implement the encoding mode prediction method described in any embodiment of the present disclosure.

With the apparatus provided in the embodiments of the present disclosure, the information of the at least two frames of images to be processed is acquired with the acquisition module, so that the information of the images to be processed can be clarified, and the at least two continuous frames of images to be processed can be easily processed later; the information of the at least two frames of images to be processed is input with the prediction module to the encoding mode prediction network for prediction and the target encoding mode is determined, since the encoding mode prediction network is the network obtained by training the convolutional neural network based on the multi-size pixel blocks, the time complexity of the conventional algorithm by which cyclic traversal is performed to search for the optimal encoding mode can be reduced. Therefore, when the target encoding mode is used for coding and/or decoding of the images to be processed, the processing time of the images to be processed can be reduced, so that the images to be processes can obtain a high compression ratio, and the coding efficiency of video images can be improved while ensuring the image quality.

It should be noted that the present disclosure is not limited to the specific configurations and processing described in the above embodiments and illustrated by the drawings. For convenience and simplicity of description, a detailed description of known methods is omitted herein, reference may be made to corresponding processes in the above method embodiments for specific operation processes of the systems, modules and units described above, and those specific operation processes will not be described in detail herein.

Figure 8:
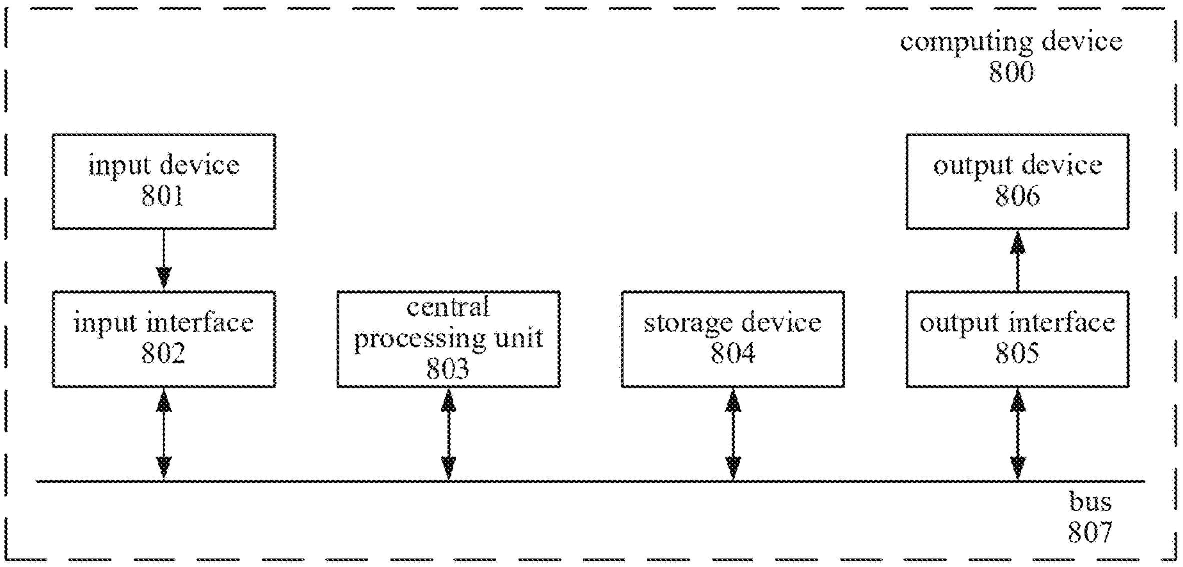
FIG. 8 is a block diagram of an exemplary hardware architecture of a computing device for implementing an encoding mode prediction method and apparatus according to embodiments of the present disclosure.

FIG. 8 is a block diagram of an exemplary hardware architecture of a computing device for implementing an encoding mode prediction method and apparatus according to embodiments of the present disclosure.

As shown in FIG. 8, a computing device 800 includes an input device 801, an input interface 802, a central processing unit 803, a storage device 804, an output interface 805, and an output device 806. The input interface 802, the central processing unit 803, the storage device 804, and the output interface 805 are connected to each other through a bus 807, and the input device 801 and the output device 806 are connected to the bus 807 through the input interface 802 and the output interface 805 respectively, so as to be further connected to other components of the computing device 800.

Specifically, the input device 801 receives input information from the outside, and transmits the input information to the central processing unit 803 via the input interface 802; the central processing unit 803 processes the input information based on computer-executable instructions stored in the storage device 804 to generate output information, temporarily or permanently stores the output information in the storage device 804, and then transmits the output information to the output device 806 via the output interface 805; and the output device 806 outputs the output information out of the computing device 800 for being used by users.

In an embodiment, the computing device shown in FIG. 8 may be implemented as an electronic device, which may include: a storage device configured to store a computer program; and a processor configured to run the computer program stored in the storage device to perform the encoding mode prediction method according to the embodiments of the present disclosure.

In an embodiment, the computing device shown in FIG. 8 may be implemented as an encoding mode prediction system, which may include: a storage device configured to store a computer program; and a processor configured to run the computer program stored in the storage device to perform the encoding mode prediction method according to the embodiments of the present disclosure.

The above description is merely of the exemplary embodiments of the present disclosure, and is not intended to limit the scope of the present disclosure. In general, the various embodiments of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing devices, but the present disclosure is not limited thereto.

The embodiments of the present disclosure may be implemented by a data processor of a mobile device executing computer program instructions. For example, the embodiments of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on a memory. The memory may be of any type suitable to local technical environment and may be implemented using any suitable data storage technology. For example, the memory is, but not limited to, a Read-Only Memory (ROM), a Random Access Memory (RAM), and an optical storage device and system (a Digital Video Disc (DVD) or a Compact Disc (CD)). A computer-readable medium may include a non-transitory storage medium. The data processor may be of any type suitable to the local technical environment. For example, the data processor is, but not limited to, a general-purpose computer, a special purpose computer, a microprocessor, a Digital Signal Processors (DSP), an Application Specific Integrated Circuit (ASIC), a Field Programmable Gate Array (FGPA), and a processor based on multi-core architecture.

The exemplary embodiments of the present disclosure are illustrated in detail above by exemplary and non-limiting examples. For those of ordinary skill in the art, various modifications and adjustments to the above embodiments can be obviously derived from the accompanying drawings and the appended claims, but those modifications and adjustments are not beyond the scope of the present disclosure. Therefore, the proper scope of the present disclosure is defined by the appended claims.

What is claimed is:

1. An encoding mode prediction method, comprising:

acquiring information of at least two frames of images to be processed, wherein the at least two frames of images to be processed are at least two continuous frames of images, and the at least two frames of images to be processed comprise a first frame of image to be processed and a second frame of image to be processed; and inputting the information of the at least two frames of images to be processed to an encoding mode prediction network for prediction, and determining a target encoding mode, wherein the encoding mode prediction network is one of a plurality of encoding mode prediction networks obtained by training a convolutional neural network based on multi-size pixel blocks, and the target encoding mode is used for coding and/or decoding of the images to be processed, and wherein inputting the information of the at least two frames of images to be processed to the encoding mode prediction network for prediction and determining the target encoding mode comprises:

determining a pixel block size corresponding to the first frame of image to be processed according to acquired Coding Tree Unit (CTU) information of the first frame of image to be processed, wherein the CTU information is configured to represent coding complexity corresponding to the first frame of image to be processed;

screening the plurality of encoding mode prediction networks according to the pixel block size corresponding to the first frame of image to be processed to obtain a target encoding mode prediction network, wherein the target encoding mode prediction network is matched with the pixel block size corresponding to the first frame of image to be processed; and inputting the information of the first frame of image to be processed and the information of the second frame of image to be processed to the target encoding mode prediction network for prediction, and determining the target encoding mode, and wherein the larger the pixel block size corresponding to the first frame of image to be processed is, the greater the number of network layers corresponding to the target encoding mode prediction network is.

2. The method of claim 1, wherein determining the pixel block size corresponding to the first frame of image to be processed according to the acquired CTU information of the first frame of image to be processed comprises:

determining the pixel block size corresponding to the first frame of image to be processed according to at least one of a number of Coding Units (CUs), a number of Prediction Units (PUs), and a number of Transform Units (TUs) which correspond to the first frame of image to be processed.

3. The method of claim 1, wherein the CTU information of the first frame of image to be processed comprises: CUs and the number of the CUs, and screening the plurality of encoding mode prediction networks according to the pixel block size corresponding to the first frame of image to be processed to obtain the target encoding mode prediction network comprises:

according to the number of the CUS, a division mode of each CU, and information of coded pixel blocks in each CU, performing cluster analysis on prediction encoding modes corresponding to the to-be-coded pixel blocks in each CU to obtain an analysis result; and determining the target encoding mode prediction network according to the analysis result.

4. The method of claim 3, wherein the analysis result comprises:

occurrence numbers of the prediction encoding modes corresponding to the to-be-coded pixel blocks in the CU, and determining the target encoding mode prediction network according to the analysis result comprises:

sorting the occurrence numbers of the prediction encoding modes corresponding to the to-be-coded pixel blocks in the CU to obtain a sorting result; and determining the target encoding mode prediction network according to the sorting result.

5. The method of claim 1, wherein before acquiring the information of the at least two frames of images to be processed, the method further comprises:

training the convolutional neural network according to a plurality of sample images and a plurality of preset pixel block sizes to obtain the plurality of encoding mode prediction networks corresponding to the plurality of preset pixel block sizes.

6. The method of claim 5, wherein training the convolutional neural network according to the plurality of sample images and the plurality of preset pixel block sizes to obtain the plurality of encoding mode prediction networks corresponding to the plurality of preset pixel block sizes comprises:

screening the plurality of sample images according to the plurality of preset pixel block sizes to obtain a plurality of to-be-tested sample image sets, wherein a plurality of to-be-tested sample images in a same to-be-tested sample image set correspond to a same pixel block size, and the to-be-tested sample images in different to-be-tested sample image sets correspond to different pixel block sizes; and inputting to-be-tested sample images in the plurality of to-be-tested sample image sets to the convolutional neural network for training to obtain the plurality of encoding mode prediction networks corresponding to the plurality of preset pixel block sizes.

7. The method of claim 6, wherein inputting the to-be-tested sample images in the plurality of to-be-tested sample image sets to the convolutional neural network for training to obtain the plurality of encoding mode prediction networks corresponding to the plurality of preset pixel block sizes comprises:

respectively processing each of the plurality of to-be-tested sample image sets as follows:

inputting the to-be-tested sample images in the to-be-tested sample image set to the convolutional neural network for training to obtain a to-be-verified encoding mode prediction network; and in a case where an output result of the to-be-verified encoding mode prediction network meets a preset condition, obtaining the encoding mode prediction network corresponding to the preset pixel block size.

8. The method of claim 7, wherein the output result of the to-be-verified encoding mode prediction network comprises: probability values of prediction modes of pixel points corresponding to an output image and a number of preset encoding modes supported by a preset coding protocol, and in a case where it is determined that the output result of the to-be-verified encoding mode prediction network meets the preset condition, obtaining the encoding mode prediction network corresponding to the preset pixel block size comprises:

calculating a loss value according to the probability values of the prediction modes of the pixel points corresponding to the output image and the number of the preset encoding modes supported by the preset coding protocol, wherein the loss value is configured to represent a multi-class cross entropy loss in the convolutional neural network; and in a case where it is determined that the loss value is within a range of a preset loss threshold, obtaining the encoding mode prediction network corresponding to the preset pixel block size.

9. The method of claim 1, wherein the information of the images to be processed comprises at least one of pixel block information of the images to be processed, a prediction mode corresponding to the pixel block information, a number of prediction modes, and CU division information.

10. An encoding mode prediction apparatus, comprising:

an acquisition module, which is configured to acquire information of at least two frames of images to be processed, wherein the at least two frames of images to be processed are at least two continuous frames of images, and the at least two frames of images to be processed comprise a first frame of image to be processed and a second frame of image to be processed; and a prediction module, which is configured to input the information of the at least two frames of images to be processed to an encoding mode prediction network for prediction, and determine a target encoding mode, wherein the encoding mode prediction network is one of a plurality of encoding mode prediction networks obtained by training a convolutional neural network based on multi-size pixel blocks, and the target encoding mode is used for coding and/or decoding of the images to be processed, and wherein the prediction module is further configured to:

determine a pixel block size corresponding to the first frame of image to be processed according to acquired Coding Tree Unit (CTU) information of the first frame of image to be processed, wherein the CTU information is configured to represent coding complexity corresponding to the first frame of image to be processed;

screen the plurality of encoding mode prediction networks according to the pixel block size corresponding to the first frame of image to be processed to obtain a target encoding mode prediction network, wherein the target encoding mode prediction network is matched with the pixel block size corresponding to the first frame of image to be processed; and input the information of the first frame of image to be processed and the information of the second frame of image to be processed to the target encoding mode prediction network for prediction, and determine the target encoding mode, and wherein the larger the pixel block size corresponding to the first frame of image to be processed is, the greater the number of network layers corresponding to the target encoding mode prediction network is.

11. An electronic device, comprising:

one or more processors; and a storage device having stored thereon one or more programs which, when executed by the one or more processors, cause the one or more processors to implement the encoding mode prediction method of claim 1.

12. A non-transitory computer-readable storage medium having stored thereon a computer program which, when executed by a processor, causes the processor to implement the encoding mode prediction method of claim 1.

* * * * *